(12) United States Patent
Ekanayake et al.

(10) Patent No.: US 12,229,491 B2
(45) Date of Patent: *Feb. 18, 2025

(54) FLEXIBLE ONLINE FORM DISPLAY

(71) Applicant: TrueContext Inc., Kanata (CA)

(72) Inventors: Gemunu Prasanna Kapila Bandara Ekanayake, Ottawa (CA); James Jeremy Goodfellow, Kanata (CA)

(73) Assignee: TrueContext Inc., Kanata (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/422,478

(22) Filed: Jan. 25, 2024

(65) Prior Publication Data

US 2024/0160829 A1    May 16, 2024

Related U.S. Application Data

(63) Continuation of application No. 17/128,132, filed on Dec. 20, 2020, now Pat. No. 11,928,417, which is a continuation of application No. 16/205,814, filed on Nov. 30, 2018, now Pat. No. 10,902,180, which is a continuation of application No. 15/179,299, filed on Jun. 10, 2016, now Pat. No. 10,198,404.

(51) Int. Cl.
| | |
|---|---|
| *G06F 40/103* | (2020.01) |
| *G06F 40/174* | (2020.01) |
| *G09G 5/00* | (2006.01) |
| *G06F 3/14* | (2006.01) |

(52) U.S. Cl.
CPC .......... *G06F 40/103* (2020.01); *G06F 40/174* (2020.01); *G09G 5/005* (2013.01); *G06F 3/14* (2013.01); *G09G 2340/0407* (2013.01); *G09G 2340/145* (2013.01)

(58) Field of Classification Search
None
See application file for complete search history.

(56) References Cited

U.S. PATENT DOCUMENTS

| | | |
|---|---|---|
| 6,639,611 B1 | 10/2003 | Leduc |
| 6,839,575 B2 | 1/2005 | Ostergaard |
| 7,725,815 B2 | 5/2010 | Peters |
| 7,912,834 B2 | 3/2011 | Gupta et al. |
| 8,677,286 B2 | 3/2014 | Davis et al. |
| 9,282,202 B2 | 3/2016 | Gowan et al. |
| 10,198,404 B2 * | 2/2019 | Ekanayake ............ G09G 5/005 |
| 10,902,180 B2 * | 1/2021 | Ekanayake ............ G09G 5/005 |

(Continued)

*Primary Examiner* — Maikhanh Nguyen
(74) *Attorney, Agent, or Firm* — Stratford Group Ltd.

(57) ABSTRACT

A method of displaying an electronic form on a mobile device comprises creating one or more repeatable items comprising a plurality of fields to be filled or displayed wherein one or more of the fields may include another one or more repeatable item. A method of displaying an electronic form on a mobile device having a screen and managed by an operating system comprises attaching a visual priority to one or more fields used in the electronic form; obtaining the current mobile device screen size; and adapting the number of fields to be displayed on the screen based on the screen size and on visual priority attached to one or more of the fields. In one implementation, a minimum width is set for each of the one or more fields, and the fields that can meet the minimum width based on the current mobile device screen size are displayed.

4 Claims, 6 Drawing Sheets

(56) References Cited

U.S. PATENT DOCUMENTS

| | | |
|---|---|---|
| 11,137,890 B2 | 10/2021 | Woo et al. |
| 11,928,417 B2 * | 3/2024 | Ekanayake ........... G06F 40/174 |
| 2006/0117253 A1 | 6/2006 | Polash |
| 2007/0180471 A1 | 8/2007 | Unz |
| 2007/0260625 A1 | 11/2007 | Tien et al. |
| 2010/0056223 A1 | 3/2010 | Choi et al. |
| 2010/0138723 A1 | 6/2010 | Bowden et al. |
| 2010/0241672 A1 | 9/2010 | Bryant et al. |
| 2011/0012930 A1 | 1/2011 | Davis et al. |
| 2011/0107196 A1 | 5/2011 | Foster |
| 2012/0054593 A1 | 3/2012 | Naderi |
| 2012/0144285 A1 | 6/2012 | Bach et al. |
| 2013/0227469 A1 | 8/2013 | Park |
| 2014/0035869 A1 | 2/2014 | Yun et al. |
| 2014/0157101 A1 | 6/2014 | Hoagn et al. |
| 2015/0116363 A1 | 4/2015 | Monte et al. |
| 2015/0135052 A1 | 5/2015 | Thompson et al. |
| 2016/0306778 A1 | 10/2016 | Kennedy, Jr. |

\* cited by examiner

FLEXIBLE ONLINE FORM DISPLAY

CROSS REFERENCE TO RELATED APPLICATIONS

This application is a continuation of U.S. patent application Ser. No. 17/128,132, filed Dec. 20, 2020, now U.S. Pat. No. 11,928,417, which is a continuation of U.S. patent application Ser. No. 16/205,814, filed Nov. 30, 2018, now U.S. Pat. No. 10,902,180, which is a continuation of U.S. patent application Ser. No. 15/179,299, filed Jun. 10, 2016, now U.S. Pat. No. 10,198,404, which are hereby incorporated by reference in their entireties.

FIELD OF THE INVENTION

The present disclosure relates to mobile forms and more specifically to displaying mobile forms on different types of devices.

BRIEF SUMMARY

In accordance with one embodiment, a method of displaying an electronic form on a mobile device, said method comprises filling out at least one of one or more cells used by the electronic form with one or more values; attaching a visual priority to the one or more cells; obtaining a display width of a screen of the mobile device; detecting a change in a viewing orientation of the mobile device; adapting a number of the one or more cells to be displayed on the screen based at least in part on said display width, said viewing orientation of said mobile device and said visual priority attached to said one or more cells; and setting a minimum width for each of said one or more cells and displaying one or more of the one or more cells that can meet said minimum width based on said display width, wherein: setting a minimum width for each of said one or more cells and displays the cells that can meet the minimum width based on said display width; and the number of cells displayed is modified when the display width changes.

In another embodiment, a mobile device for displaying an electronic form comprises: a processor configured to execute code to display on a screen of the mobile device one or more repeats comprising one or more cells, at least one of the one or more cells being filled in with one or more values; to attach a visual priority to the one or more cells used in the electronic form; to obtain a display width of the screen of the mobile device; to detect a change in a viewing orientation of the mobile device; to adapt a number of the one or more cells to be displayed on the screen based at least in part on the display width, said viewing orientation of the mobile device and the visual priority attached to the one or more cells; and to set a minimum width for each of said one or more cells and display one or more of the one or more cells that can meet said minimum width based on said display width, wherein: the processor sets a minimum width for each of said one or more cells and displays the cells that can meet the minimum width based on said display width; and the number of cells displayed is modified when the display width changes. The foregoing and additional aspects and embodiments of the present disclosure will be apparent to those of ordinary skill in the art in view of the detailed description of various embodiments and/or aspects, which is made with reference to the drawings, a brief description of which is provided next.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 1 is an example of a form with repeatable items.

Figure 2:
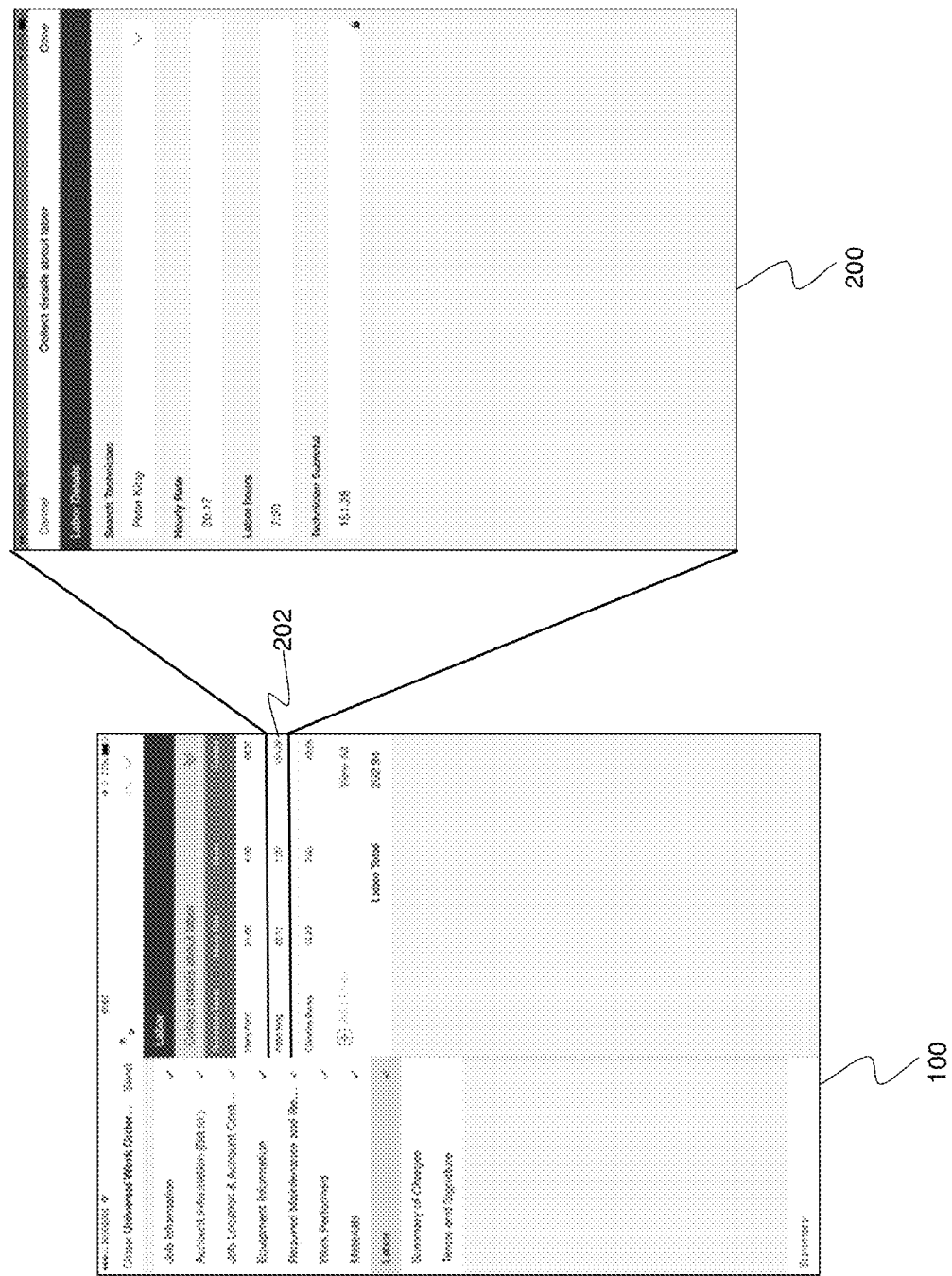
FIG. 2 is an example of the display of the repeatable item.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The use of electronic forms is becoming pervasive allowing for automatic data entry, reducing the need for paper and reducing errors. Mobile devices such as smart phones or tablets are now used to fill electronic forms on site (e.g., building inspections etc.). However, the form factor of the screen of these mobile devices makes it difficult to display all the fields that need to be seen or filled. Generally, electronic forms are designed to be similar to their paper equivalent, making the display of information very difficult.

Figure 1:
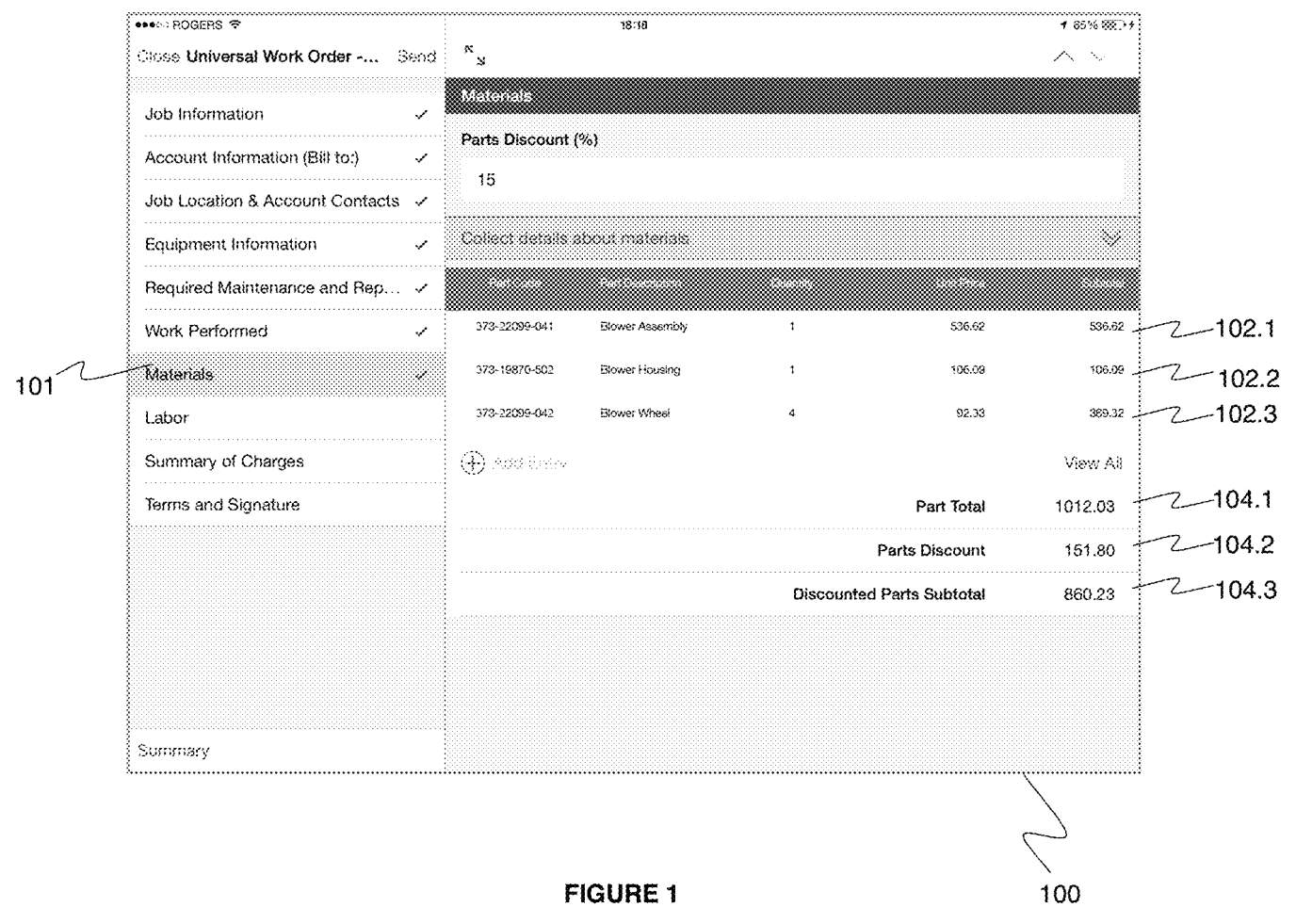

FIG. 1 illustrates an electronic form 100 that is designed such that some cells 101 contain a flexible number of repeats 102.1 . . . 102.2. The repeats 102.1 . . . 102.2 contain one or more cells to be filled/viewed in separate screens, but are summarized at the top level. The summary at the top level can contain aggregation of information such as different types of totals 104.1, 104.2, 104.3 which can aggregate any of the data in some or all of the repeatable items using mathematical functions such as, but not limited to, SUM, AVERAGE, MIN, MAX, COUNT, MEDIANs, IF. As per FIG. 2, the repeats 202, can be filled using a separate electronic form 200 which displays all the cells to be filled/viewed.

Figure 3:
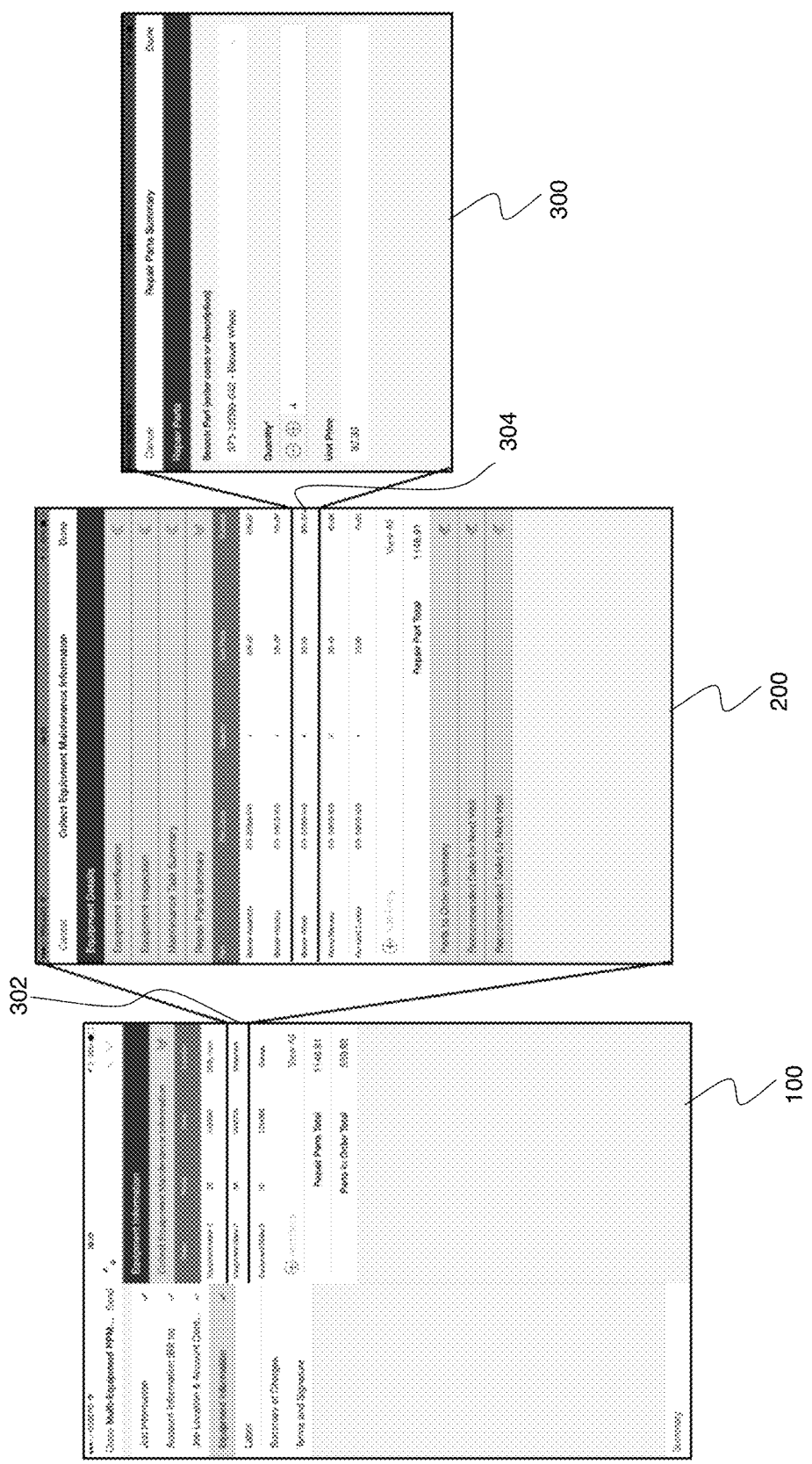
FIG. 3 is an example of a hierarchical for with two repeatable items nested.

As per FIG. 3, the repeats 302 in the top level form 100 can also contain one or more repeats such as item 304 which then can be filled using a separate electronic form 300. These nested repeats can be any level deep to form a hierarchical form 100 which is very easy to display on any types of devices. Different levels of the nesting can be dispatched or sent to a user to fill without having to send the entire form, allowing for collaboration in filling the entire form.

Figure 4:
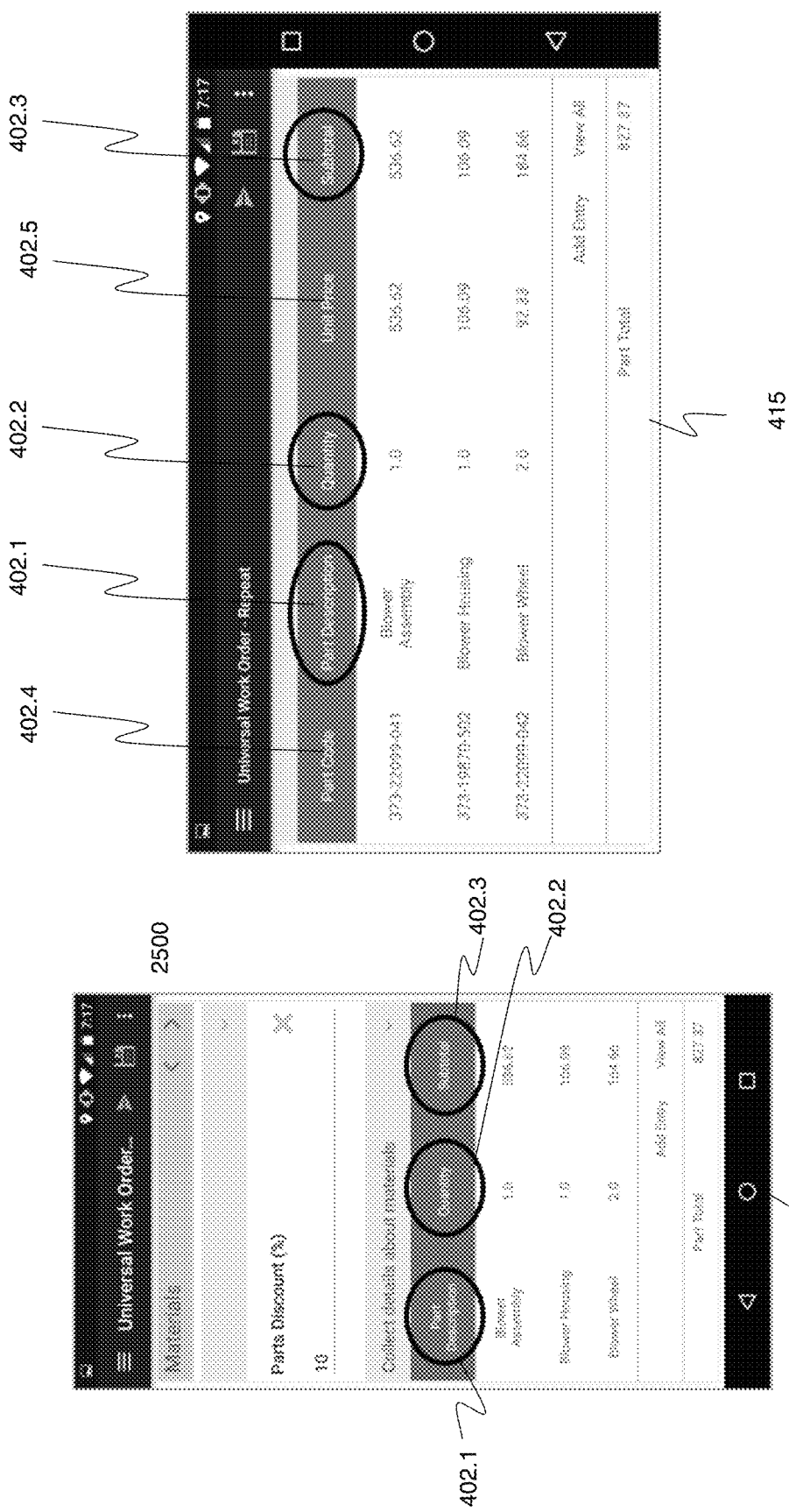
FIG. 4 is an example of the same form displayed on two different size screens.

Referring to FIG. 4, in another embodiment, the information cells on an electronic form are programmed with a visual priority parameter to identify which cells to show depending on the size of the device screen. Each cell may also be programmed with a minimum width value which means that it is to be displayed only if there is a minimum width available on the screen. When the form is loaded on the mobile device, the operating system of the device provides the form application with the width of the device. The application uses this information to present only the number of fields that can fit on the screen based on the minimum width parameter and also based on the priority. Furthermore, if the device offers a landscape/portrait mode, which means the screen can be turned to be wider, the operating system indicates to the application that the orientation of the screen has changed and that the width of the screen is different. The application can therefore display more (or fewer) cells based on the minimum width and the visual priority parameters. FIG. 4 shows an example of a form that comprises five cells 402.1 . . . 402.5. All the cells are displayed with the device is in landscape mode 415; however, when the device is in portrait mode 410, only some cells 402.1 . . . 402.3 are displayed in narrower columns to fit the screen without having to reduce the font size. Some cells may also be expandable, such that more information is displayed when the screen is wider.

If the operating system offers screen splitting for multi-tasking or "picture-in-picture," it also notifies the form application when the screen dimension is affected by these capabilities, and the display of the electronic form is changed, if needed, based on the minimum width or visual priority parameters.

Figure 5:
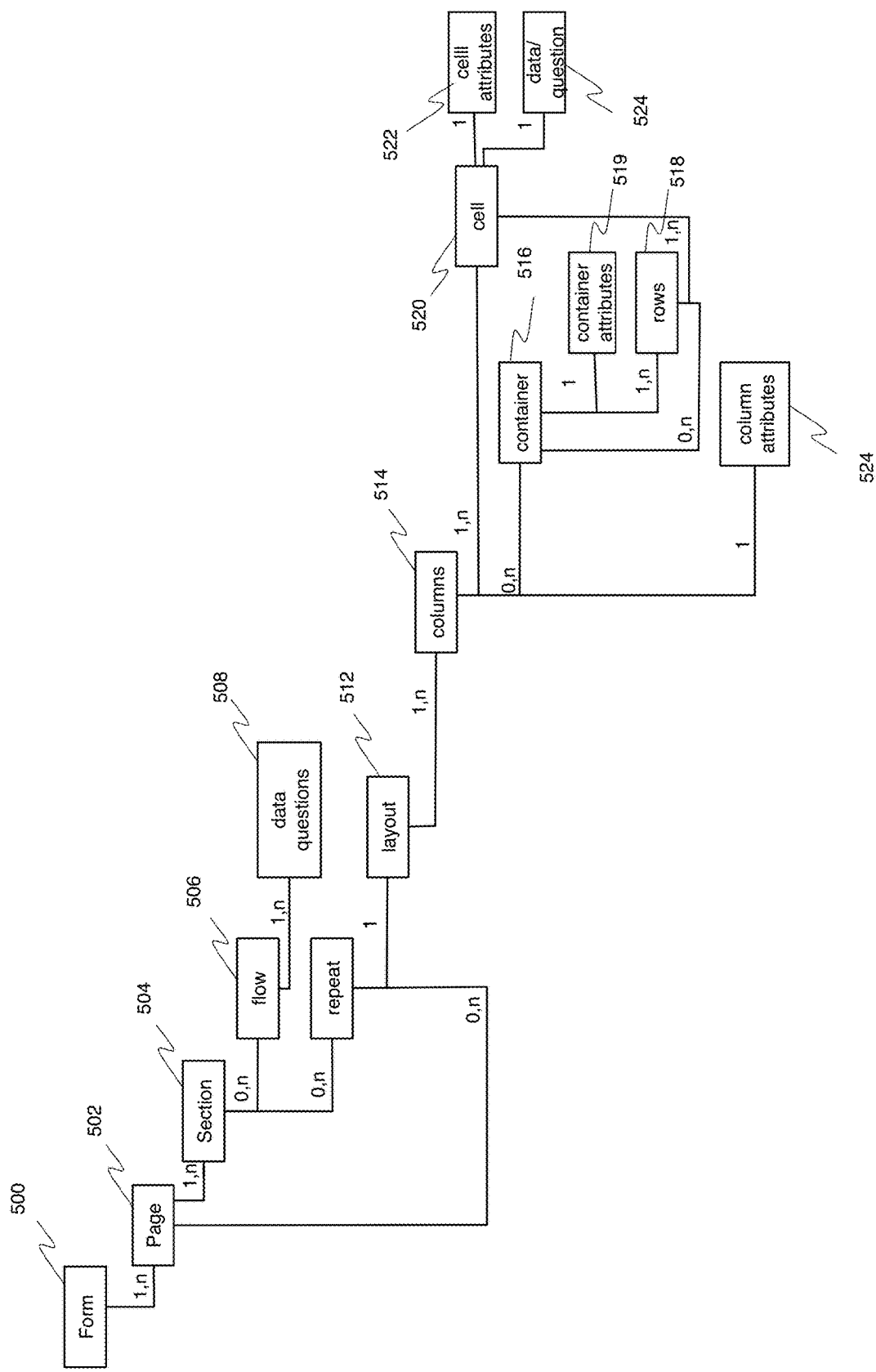
FIG. 5 is an example of the data structure used to implement the hierarchical form.

FIG. 5 shows an example data structure that supports the embodiments. The form 500 comprises one or more pages 502. A page 502 comprises one or more sections 504. A section 504 may comprise one or more flows 506 which represents one or more questions or data 508. The section 504 may also contain repeats 510. The repeat 510 comprises a layout 512 and may also comprise one or more pages 502 to create the hierarchy. The layout 512 comprises one or more columns 514. A column comprises one or more cells 520 and may comprise one or more containers 516 which comprise one or more rows 518. A row 518 comprises one or more cells 520 and may comprise one or more containers 516. The cell 520 comprises a set of attributes 522, a question and data associated with it 524.

The set of attributes 522 associated with the cell 520 comprises different attributes for displaying the cell, for example the font, color etc. It also includes the minimum width required to display the cell, whether the cell is expandable (yes or no) and the order from left to right in which the cell is displayed in the row 518 as well as what is a priority code for the cell. Priority could be expressed in H, M, L or using a number from 1 to x where 1 is either highest or lowest priority. Similarly, the set of attributes associated with a column 524 and with a container 516 includes the minimum width required to display the column (or container), whether the container as a whole is expandable and the order from left to right to display the column (or container) on the screen as well as a priority code expressed using the same system as for the cell.

Figure 6:
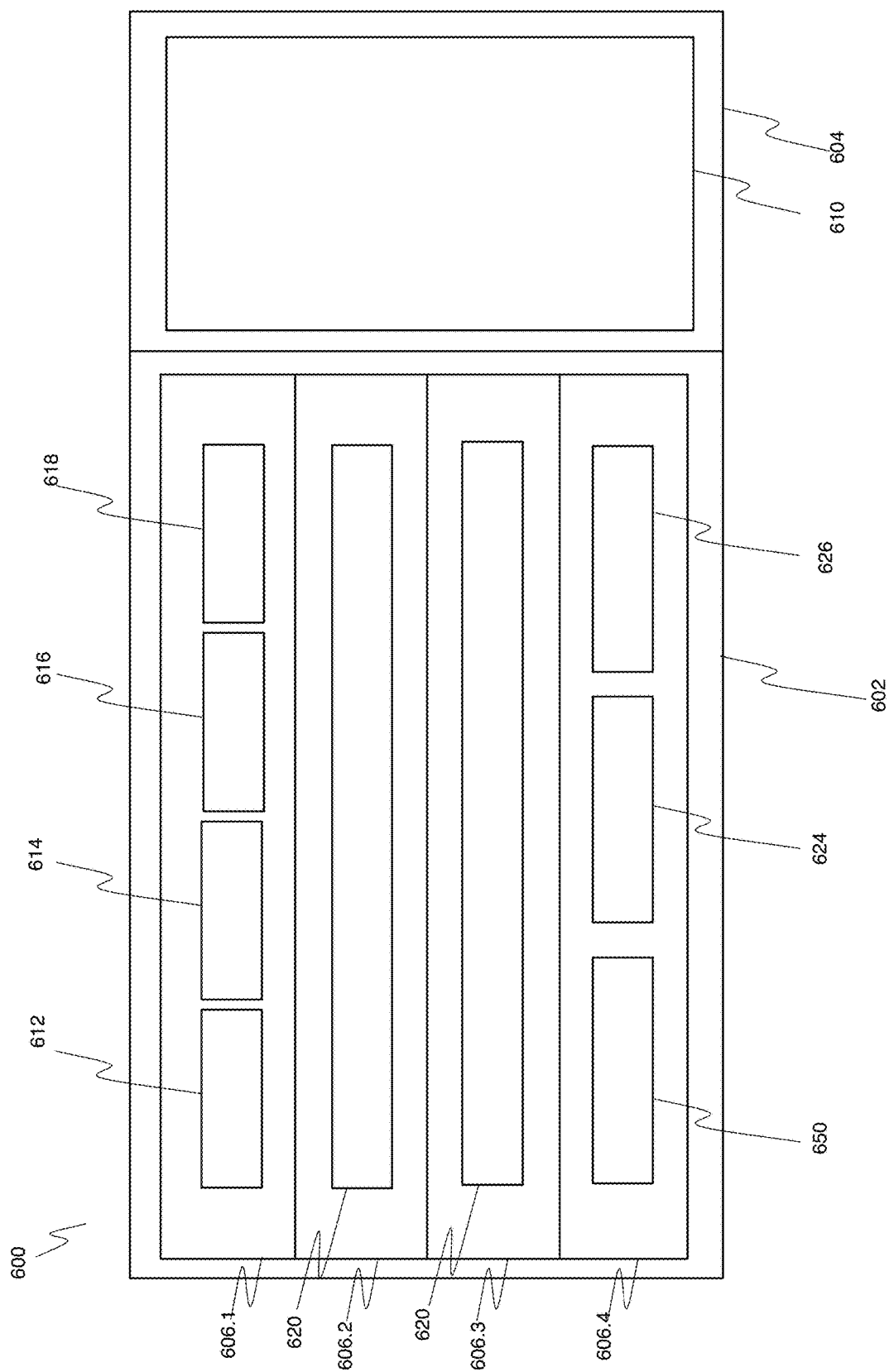
FIG. 6 is an example of the elements of the form.

In an example illustrated in FIG. 6, the section 600 contains two columns 602, 604. The left column 604 comprises only one cell 610. The right column 602 comprises a container 650 which is made of four rows 606.1 . . . 606.4. The first row 606.1 comprises four cells 612, 614, 616, 618. The second and third rows 606.2, 606.3 contain one cell 620 each. The last row 606.4 contains three cells 622, 624, 626.

When the size of the display is reduced to W, the system either pre-processes all the pages of all open forms to re-adjust the actual width used to display the information (data/questions), or it only processes the page that is displayed to re-adjust the actual width and optionally pre-processes the other pages in the background.

For each repeat in each section of the page, an actual column width Wa is calculated for each column. If the sum of the minimum column width of all columns in the repeat is greater than W, then the lowest priority columns starting from the right of the display are removed (actual width set to 0 or another similar indicator) until the sum of the remaining column width Wr is below or equal to W. Then, if Wr is lower than W, a remainder $R=(W-(Wr-Wrn)/Ce$ is calculated where Ce is the number of remaining columns that have the expandable attribute ON, and Wrn is the sum of the width of the remaining columns with the expandable attribute OFF. The actual width of the remaining columns with the expandable attribute ON is set to their minimum column width plus R.

For each column, the actual width is used to perform the same algorithm to establish the width of its containers and cells. The width of the container defines the width of its rows. And the width of a container within a row inherits the attributes of the container housing the rows recursively. When all the actual widths are established for all the cells in the page, the page is displayed.

The same process is used when the display width is increased. All cells and containers are reviewed to determined how many can be displayed on the wider screens. If their minimum widths all fit on the screen width, then the expandable ones can have their size increased.

The size increase of the expandable cells/containers could optionally be done proportionally to the priority level of the cells/containers or using another attribute to define a weight to use when redistributing the remaining space.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of displaying an electronic form on a mobile device, said method comprising:
    displaying, by a processor, on a screen of the mobile device one or more repeats comprising one or more cells used by the electronic form;
    attaching, by the processor, a visual priority to the one or more cells used by the electronic form;
    adapting, by the processor, a number of the one or more cells to be displayed on a screen of the mobile device, based at least in part on one or more viewing properties of said mobile device and said visual priority attached to said one or more cells; and
    setting, by the processor, a minimum width for each of said one or more cells and displaying one or more of the one or more cells that can meet said minimum width based on said one or more viewing properties of said mobile device,
    wherein:
    the number of cells displayed is modified when the one or more viewing properties changes, and
    the one or more viewing properties of the mobile device comprise one or more of:
    a display width of the screen of the mobile device and a viewing orientation of the mobile device.

2. The method of claim 1, further comprising displaying, by the processor, a summary of said one or more cells comprising one or more of a sum, average, minimum, maximum, count, or a median of one or more values filling said one or more cells.

3. A mobile device for displaying an electronic form, said device comprising:
    a processor configured to execute code, the code comprising instructions:
    to display on a screen of the mobile device one or more repeats comprising one or more cells used by the electronic form;
    to attach a visual priority to the one or more cells used by the electronic form;
    to adapt a number of the one or more cells to be displayed on a screen of the mobile device, based at least in part on one or more viewing properties of said mobile device and said visual priority attached to said one or more cells, and wherein:
    the processor sets a minimum width for each of said one or more cells and displays the cells that can meet the minimum width based on said one or more viewing properties of said mobile device; and
    the number of cells displayed is modified when the one or more viewing properties changes,
    wherein the one or more viewing properties of the mobile device comprise one or more of: a display width of the screen of the mobile device and a viewing orientation of the mobile device.

4. The mobile device of claim 3, wherein at least one of the one or more cells comprises a summary of said one or more cells, the summary comprising one or more of a sum, average, minimum, maximum, count, or a median of one or more values filling said one or more cells.

* * * * *